F. E. DRAKE.
VEGETABLE CUTTER.
APPLICATION FILED NOV. 12, 1913.

1,095,092.

Patented Apr. 28, 1914.

Witnesses
Hugh H. Ott
James A. Koch

Inventor
Florence E. Drake
By Victor J. Evans
Attorney

UNITED STATES PATENT OFFICE.

FLORENCE E. DRAKE, OF MICHIGAN CITY, INDIANA.

VEGETABLE-CUTTER.

1,095,092. Specification of Letters Patent. Patented Apr. 28, 1914.

Application filed November 12, 1913. Serial No. 800,566.

*To all whom it may concern:*

Be it known that I, FLORENCE E. DRAKE, a citizen of the United States, residing at Michigan City, in the county of Laporte and State of Indiana, have invented new and useful Improvements in Vegetable-Cutters, of which the following is a specification.

This invention relates to vegetable cutters, and particularly to a cutter designed especially for cutting cooked vegetables and preparing the same for the table; and it has for its primary object the provision of a cutter of this character which will consist of separable cutting blades and means for securely holding the blades connected with one another, while facilitating the operation of separating the blades when it is desired to clean the same.

With the above and other objects in view, the invention consists of certain novel features of construction, combination and arrangement of parts, as will be hereinafter described and claimed.

Figure 1:
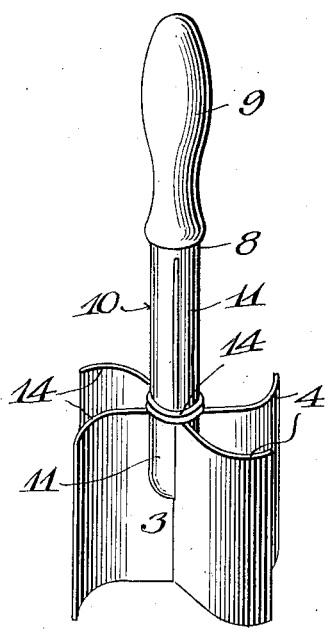
Figure 2:
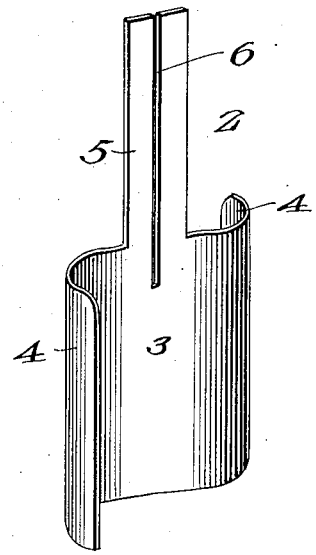
Figure 4:
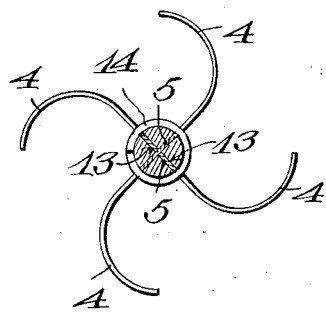
Figure 3:
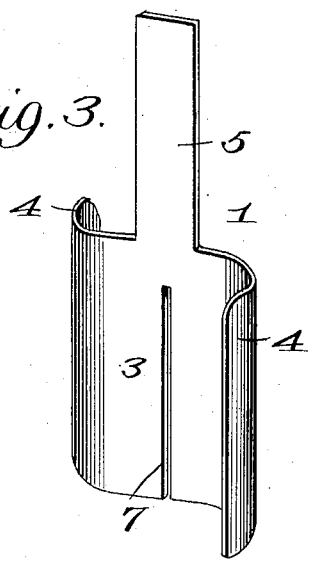

In the accompanying drawings:—Figure 1 is a perspective view of the cutter; Fig. 2 is a perspective view of one of the blades; Fig. 3 is a perspective view of the other blade; and Fig. 4 is a horizontal section, taken on the line 4—4 of Fig. 1.

The cutter comprises companion cutting blades 1 and 2, each being provided with a main body portion 3 curved in opposite directions from a point beyond its center, as at 4. Rising from the body portion of each blade is a relatively flat tank or shank 5, the shank of the blade 2 being split throughout as at 6. The body portion of the blade 1 is split vertically, as at 7 in line with the shank 5 of said blade 1, whereby the two blades may straddle each other, as shown in Fig. 1, and the shanks 5 of the blades arranged collectively so as to form a substantially Maltese cross shaped attaching portion, as shown in Fig. 4.

The handle 8 is provided with a main upper gripping portion 9 and a lower retaining portion 10, the latter being split longitudinally in two directions so that sections 11 of the portion 10 are rendered free from each other and formed whereby they will serve as movable clamps to hold the shanks 5 of the cutting blades 1 and 2 in applied positions. By separating the sections 11 from each other in the manner specified intervening transverse slots 13 are formed between the respective sections 11 for the reception of the shanks 5 of the cutting blades, as shown in Fig. 4. The shanks are adapted to be extended into the clamping portion 10 of the handle and they may be secured therein by means of an actuating ring 14, the latter being formed preferably from a single length of wire wound to provide several convolutions. The ring is adapted to slide freely on the portion 10 of the handle and to engage against the external surfaces of the sections 11, whereby to move said sections into effective clamping engagement with the shanks 5. The portion 10 of the handle is preferably of an increased diameter in the direction of its free end so as to increase the clamping action of the ring.

From the construction of the device described it is seen that efficient means are employed for holding the blades operatively set up relatively and connected with the handle while constructed in a manner which will permit the blades to be separated expeditiously when it is desired to clean the same.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

I claim:—

A vegetable cutter comprising companion blades having central shanks of reduced width, the body portion of one of the blades being split in line with the longitudinal center of its shank, the shank of the other blade being split so as to straddle the first shank and extending at right angles to, a handle into which said shanks extend, and means surrounding said handle and shanks for securing said parts together.

In testimony whereof I affix my signature in presence of two witnesses.

FLORENCE E. DRAKE.

Witnesses:
H. A. TROWAGER,
ANNIE L. HOPKINS.